US005461549A

United States Patent [19]

Lietar et al.

[11] Patent Number: 5,461,549

[45] Date of Patent: Oct. 24, 1995

[54] LOW BEAM HEADLIGHT FOR MOTOR VEHICLES

[75] Inventors: Christian Lietar, Morges, Switzerland; Henning Hogrefe, Reutlingen; Rainer Neumann, Stuttgart, both of Germany

[73] Assignee: Robert Bosch GmbH, Stuttgart, Germany

[21] Appl. No.: 23,568

[22] Filed: Feb. 26, 1993

[30] Foreign Application Priority Data

Mar. 5, 1992 [DE] Germany .......................... 42 06 881.9

[51] Int. Cl.$^6$ .......................... B60Q 1/04

[52] U.S. Cl. .......................... 362/61; 362/211; 362/297; 362/346

[58] Field of Search .......................... 362/61, 211, 297, 362/304, 346, 347, 350

[56] References Cited

U.S. PATENT DOCUMENTS

| | | | |
|---|---|---|---|
| 4,754,374 | 6/1988 | Collot | 362/61 |
| 4,924,359 | 5/1990 | Lindae et al. | 362/297 |
| 5,086,376 | 2/1992 | Bleasseau | 362/61 |
| 5,192,124 | 3/1993 | Kawashima et al. | 362/346 |
| 5,215,368 | 6/1993 | Neumann | 362/304 |

FOREIGN PATENT DOCUMENTS

| | | | |
|---|---|---|---|
| 0250284 | 12/1987 | European Pat. Off. . | |
| 3406876 | 7/1985 | Germany | 362/346 |

*Primary Examiner*—Ira S. Lazarus
*Assistant Examiner*—Y. Quach
*Attorney, Agent, or Firm*—Michael J. Striker

[57] ABSTRACT

A low beam headlight for motor vehicles has a reflector having an optical axis and a light outlet opening, a light body, a light disc covering the light outlet opening of the reflector, the reflector having an upper region and a lower region having different reflection surfaces which have different shapes and at least partially form a portion of at least approximately general paraboloid and which reflect images of the light body for forming a light distribution with a light-dark limit having a substantially horizontal portion and a portion which is inclined relative to the substantially horizontal portion at an angle $\alpha$, the reflector being formed so that in sections through the reflector which are perpendicular to the optical axis, section curves are produced whose eccentricity is changeable over their course so that an uppermost image of the light body which is reflected from the upper reflector region has an upper edge adjoining the horizontal uppermost of the light-dark limit and an uppermost image of the light body which is reflected from the lower reflector region has an upper edge which adjoins the inclined portion of the light-dark limit, the upper and lower regions of the reflector contacting one another in a contact plane, the eccentricity of the section curves increasing from zero in the contact plane to a maximal value in an axial plane extending perpendicular to the contact plane, the contact plane being an axial plane which is inclined relative to a horizontal plane at the half angle $\alpha$ of an inclination of the inclined portion of the light-dark limit and in a same direction as the inclined portion.

9 Claims, 3 Drawing Sheets

LOW BEAM HEADLIGHT FOR MOTOR VEHICLES

BACKGROUND OF THE INVENTION

The present invention relates to a low beam headlight for motor vehicles.

A low beam headlight for motor vehicles is disclosed for example in the European patent document EP 0,250,284 A1. The low beam headlight disclosed in this reference has a reflector, a light body and a light disc which covers the light opening of the reflector. The light body is offset relative to the optical axis of the reflector upwardly so that its lower limit is located substantially at the optical axis. The reflector is subdivided into several sectors which are located above and below a horizontal axial plane and have different reflection surfaces. A first sector extends at one side of the reflector starting from the horizontal axial plane to an angle a inclination upwardly, while a second sector extends at the other side of the reflector starting from the horizontal axial plane to an angle a inclination downwardly. Both sectors have reflection surfaces in form of rotation paraboloids. These sectors are connected with one another by two adjacent sectors located above and below the horizontal axial plane and having reflection surfaces in form of general paraboloids. A general paraboloid contains in all axial longitudinal section parabolas however with different lengths.

The known low beam headlight produced a light distribution with a light-dark limit which has a substantially horizontal section on the opposite traffic side and a section which increases relative to the horizontal under the angle $\alpha$ to the roadway edge of the roadway upwardly. The light disc has to be provided only with low intensity optical means for forming the light distribution. Closely under the light-dark limit a high light intensity is desired to produce a great range and a maximum sharp image of the light-dark limit. The light distribution produced by the known reflector does not provide however this to the desired degree.

SUMMARY OF THE INVENTION

Accordingly, it is an object of the present invention to provide a low beam headlight for vehicles, which avoids the disadvantages of the prior art.

In keeping with these objects and with others which will become apparent hereinafter, one feature of the present invention resides, briefly stated, in a low beam headlight in which in sections through the reflector perpendicular to its optical axis section curves are produced with eccentricity which is changeable over its periphery so that the uppermost image of the light body reflected from the left part of the upper reflector region borders with its upper edge at the horizontal portion of the light-dark limit, and the uppermost image of the light body reflected from the right part of the upper reflector region borders with its upper edge at the inclined portion of the light-dark limit, while the uppermost image of the light body reflected from the left part of the lower reflector region borders with its upper edge at the inclined portion of the light-dark limit, and the uppermost image of the light reflected from the right part of the lower reflector region borders with its upper edge at the horizontal portion of the light-dark limit.

When the low beam headlight is designed in accordance with the present invention, a high light intensity is available closely under the light-dark limit and thereby a great range of the light is obtained and the light-dark limit is clearly pronounced.

In accordance with another feature of the present invention, the eccentricity of the section curves can increase starting from the contact plane from substantially zero to the axial plane perpendicular to the contact plane.

Still a further feature of the present invention is that the upper reflector region and the lower reflector region are in contact in an axial plane which is arranged relative to the horizontal at the half inclination $\alpha$ of an inclination of the inclined section of the light-dark limit and in the same direction in which said inclined section is inclined.

The upper reflector region and the lower reflector region can have a same section curve located in their contact plane and having a focal point substantially in the center of the light body on the optical axis of the reflector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
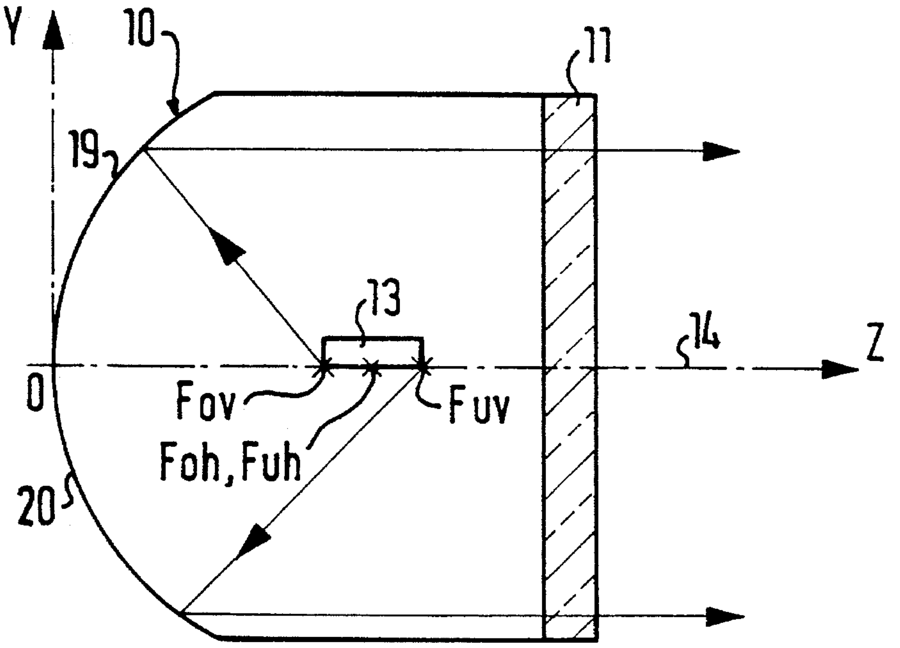
FIG. 1 is a view showing a vertical longitudinal section of a low beam headlight for motor vehicles in accordance with the present invention.

A low beam headlight for motor vehicles shown in FIG. 1 has a reflector 10 with a light outlet opening closed by a light disc 11. The light disc is provided with optically active elements. A light body 13 is arranged in the headlight and can be formed as an incandescent coil of an incandescent lamp or a light arc of a gas discharge lamp. The light body extends substantially parallel to an optical axis 14 of the reflector 10, and is somewhat offset upwardly relative to the optical axis so that its lower limit approximately is located on the optical axis 14.

Figure 2:
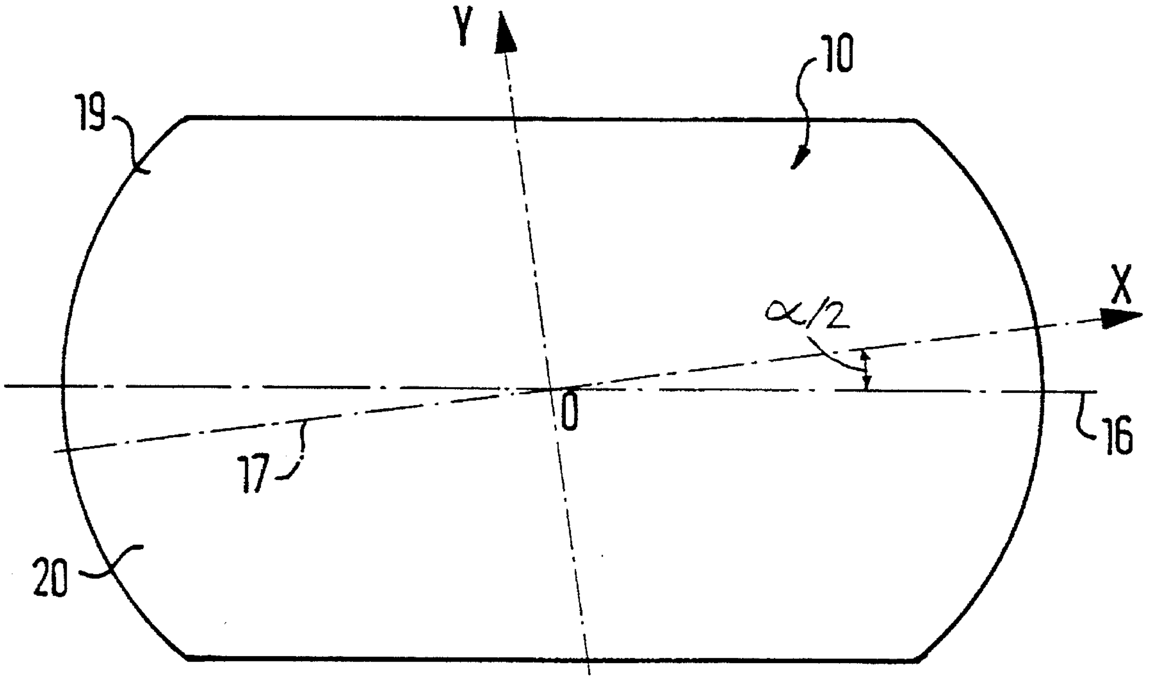
FIG. 2 is a rear view of a reflector of the inventive headlight.

The reflector 10 is subdivided into an upper reflector region 19 and a lower reflector regions 20 in a plane which is shown in FIG. 2 and inclined at an angle $\alpha/2$ to a horizontal 16. Both reflector regions 19 and 20 have reflection surfaces 19*a*, 19*b*, 20*a* and 20*b* in form of general paraboloids. Both reflector regions and 20 merge in the contact plane 17 in a second order continuously into one another. In other words, both reflector regions have the same tangents in the contact plane 17.

Figure 3:
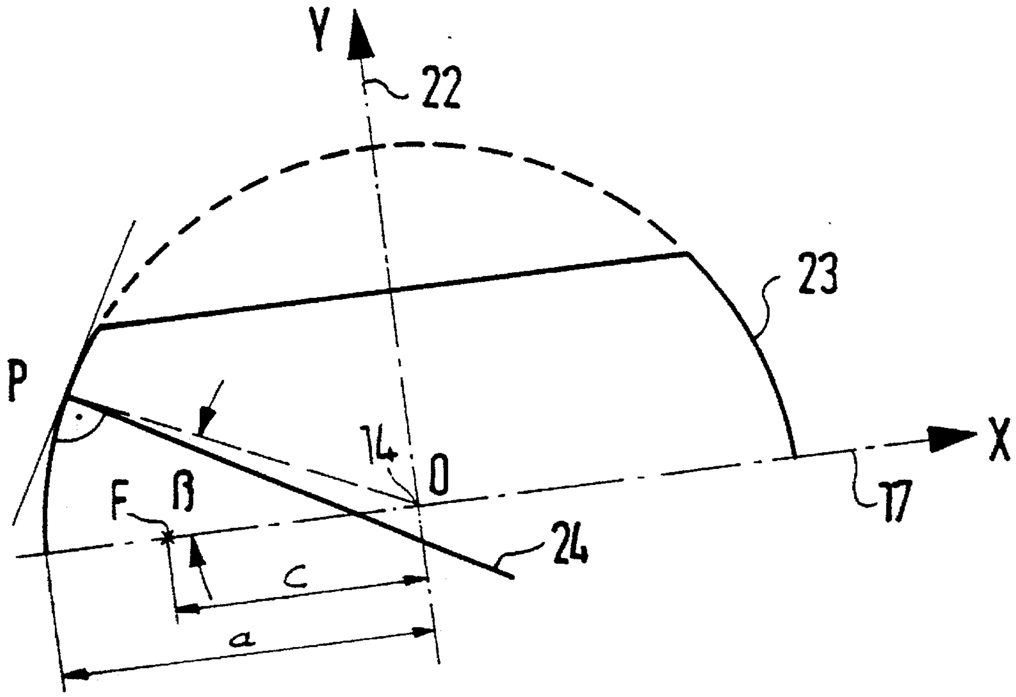
FIG. 3 is a view showing an upper partial surface of the reflector in a transverse section perpendicular to an optical axis.

FIG. 3 shows a cross-section through the upper regions 19 of the reflector 10. The upper reflector regions 19 has a reflection surface formed as a general paraboloid. The general paraboloid contains parabolas in all axial longitudinal sections, or in other words in the longitudinal sections which contain the optical axis 14. The parabolas however have different focal lengths and a common apex, so that different focal point positions for different parabolas are provided. The focal point Foh of the parabola located in the contact plane 17 is arranged substantially in the center of the light body 13 and on the optical axis 14. The focal point Fov of the parabola located in the axial plane 22 extending perpendicular to the contact plane 17 is arranged substantially in the end region of the light body 13 which faces the reflector apex and on the optical axis 14. During transition from the contact plane 17 to the perpendicular axial plane 22 the focal point of the parabola provided in the corresponding axial longitudinal section "wonders" from the center of the light body 13 to the end region of the light body facing the reflector apex.

An ellipse-like section curve 23 is formed in the cross-section through the upper reflector region 19 of the reflector 10. The numerical eccentricity of the section curve 23 is changing from the contact plane 17 to the perpendicular axial plane 22. The numerical eccentricity α of the section curve 23 is defined as the ratio of the distance c of the focal point F of the section 23 from the optical axis 14 to the greater semi-axis a of the section curve 23, e=c/a. Preferably the eccentricity e of the section curve 23 in the region of the contact plane 17 is approximately zero, so that the normal to the section curve 23 intersects the optical axis 14 and section curve 23 in this region is approximately a circle. The eccentricity e of the section curve 23 increases to the perpendicular axial plane 22 or in other words with increasing angle β between a straight line OP which connects a reflector point P with the optical axis 14, and the contact plane 17. Up to an angle β of approximately 45°, the distance between the normal 24 to the section curve 23 and the optical axis 14 increases. From an angle β of approximately 45° up to the vertical axial plane 22 with the angle β=90°, the distance between the normal 24 to the section curve 23 and the optical axis 14 again reduces to approximately zero. The eccentricity e of the section curve 23 reaches its highest value in the perpendicular axial plane 22.

Figure 4:
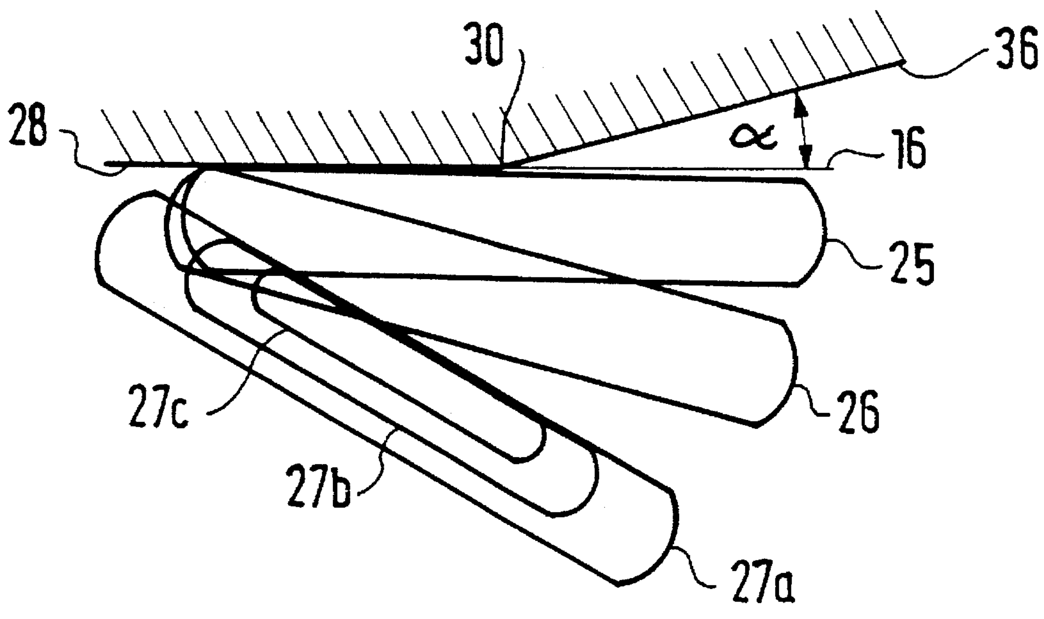
FIG. 4 is a view showing images of a light body which are reflected from the upper left partial surface of the reflector.

FIG. 4 shows images of the light body 13 reflected from the left upper part of region 19 of the reflector 10 as seen from the rear side of the reflector. The images 25–27 of the light body 13 are reflected from different parts of the reflector region 19, whose normals of the section curve produced in the cross-section as described hereinabove, have correspondingly different distances from the optical axis 14. Due to the above described design of the section curve, the uppermost image 25 of the light body 13 adjoins with its upper edge directly a horizontal portion 28 of the light-dark limit 30. The uppermost image of the light body reflected from the right part of the upper reflector region 19 adjoins with its upper edge directly a portion 36 of the light-dark limit 30, which raises under an angle relative to the horizontal. The further images 26 and 27 are located underneath the light-dark limit and are inclined relative to the horizontals in correspondence with the position of the respective reflector region relative to the light body 13. The images 27*a*–27*c* are reflected from the reflector regions which are all located on the same parabola but have different distances from the optical axis 14 and therefore reflect images of different sizes. The images 25–27 are derived only from the regions of the left half of the upper reflector region 19 as considered in the light outlet direction, for the sake of observation in FIG. 4.

The lower region 20 of the reflector 10 also has a reflection surface formed as a general paraboloid. The focal point Fuh of the parabola located in the contact plane 17, as in the upper region 19, is arranged substantially in the center of the light body 13 and on the optical axis 14. The focal point Fuv of the parabola located in the perpendicular axial plane 22 is arranged in the end region of the light body 13 facing away of the reflector apex and on the optical axis 14. During the transition from the parabola located in the contact plane 17 to the parabola located in the perpendicular plane 22 the focal point "wonders" from the center of the light body 13 to its end region facing the reflector apex. In the lower region 20 also an ellipse-like section curve is produced with a cross-section perpendicular to the optical axis 14. Its eccentricity starting from the contact plane 17 in which it is zero, reaches its highest value in the perpendicular axial plane 22.

Figure 5:
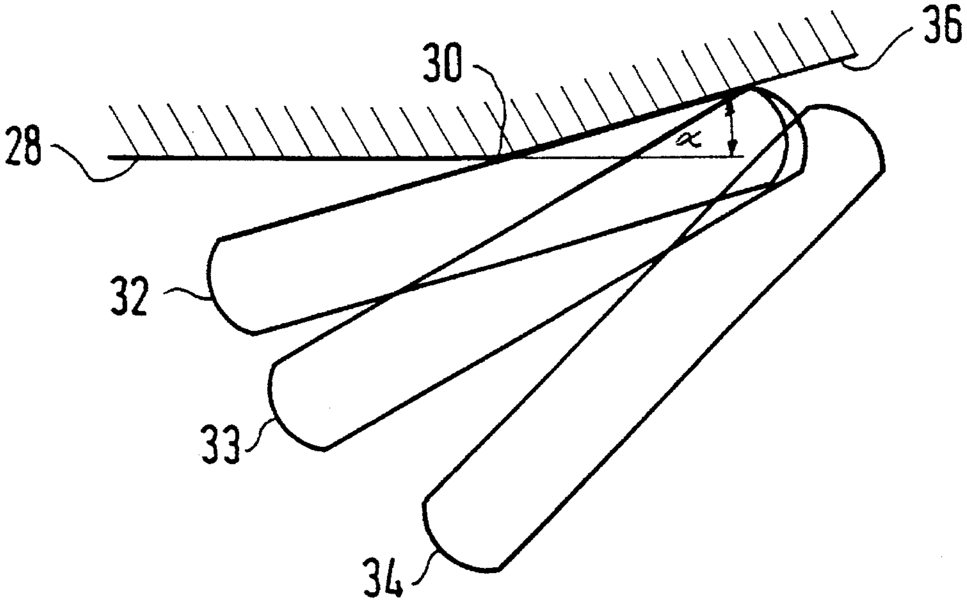
FIG. 5 is a view showing images of the light body which are reflected from the lower left partial surface of the reflector.

FIG. 5 shows images of the light body 13 which are reflected from the left part of lower reflector region 20 as seen from the rear side of the reflector. The images 32–34 of the light body 13 are reflected from different parts of the reflector region 20 whose normals of the section curve produced in the cross-section, as described above, have correspondingly different distances from the optical axis 14. Due to the above described design of the section curve, the uppermost image 32 of the light body 13 adjoins with its upper edge directly the portion 36 of the light-dark limit 30, which raises under an angle α relative to the horizontal. The uppermost image of the light body reflected from the right part of the lower reflector region 20 adjoins with its upper edge directly the horizontal portion 28 of the light-dark limit 30. The further images 33 and 34 are located underneath the light-dark limit and inclined relative to the horizontals in correspondence with the position of the respective reflector region relative to the light body 13. The images 32–34 are derived only from the regions of the left half of the reflector region 20 as considered in the light outlet direction, for the sake of observation of FIG. 5.

The reflector surfaces of the upper and lower reflector regions and 20 can be calculated in accordance with the subsequent mathematical equation. First a coordinate system with the beginning 0 in the reflector apex and the optical axis 14 as z-axis is provided. The x-axis of the coordinate system extends perpendicular to the z-axis and is located in the contact plane 17. The y-axis of the coordinate system extends both perpendicular to the z-axis and to the x-axis and is located in the perpendicular axial plane 22. The mathematical equation for determination of the reflection surfaces is as follows:

$$\frac{x^2}{a^2} + \frac{y^2}{b^2} - 1 = 0$$

whereby $a^2=4\cdot f_x\cdot z$ $$\text{and } b^2 = 4\cdot z\cdot\left[f_x + (f_y - f_x)\cdot\left(c\cdot\left|\frac{y}{4\cdot f_y\cdot z}\right| + (1-c)\cdot\left(\frac{y}{4\cdot f_y\cdot z}\right)^2\right)\right]$$

Here x, y, z are coordinate of a reflector point;

$f_x$, $f_y$ are focal lengths of the parabolas located in the contact plane 17 or in the perpendicular axial plane 22 c is a coefficient which serves for adjustment of the upper illumination edge of the light to the required light-dark limit.

In accordance with one example, the center of the light body 13 is arranged at a distance of approximately 24 mm from the reflector apex. The value of the parameters for the upper reflector region 19 are:

$f_x$=23.8 mm, $f_y$=21.2 mm and c=1.37

The value for the lower reflector region 20 are:

$f_x$=23.8 mm, $f_y$=27.6 mm and c=0.

Figure 6:
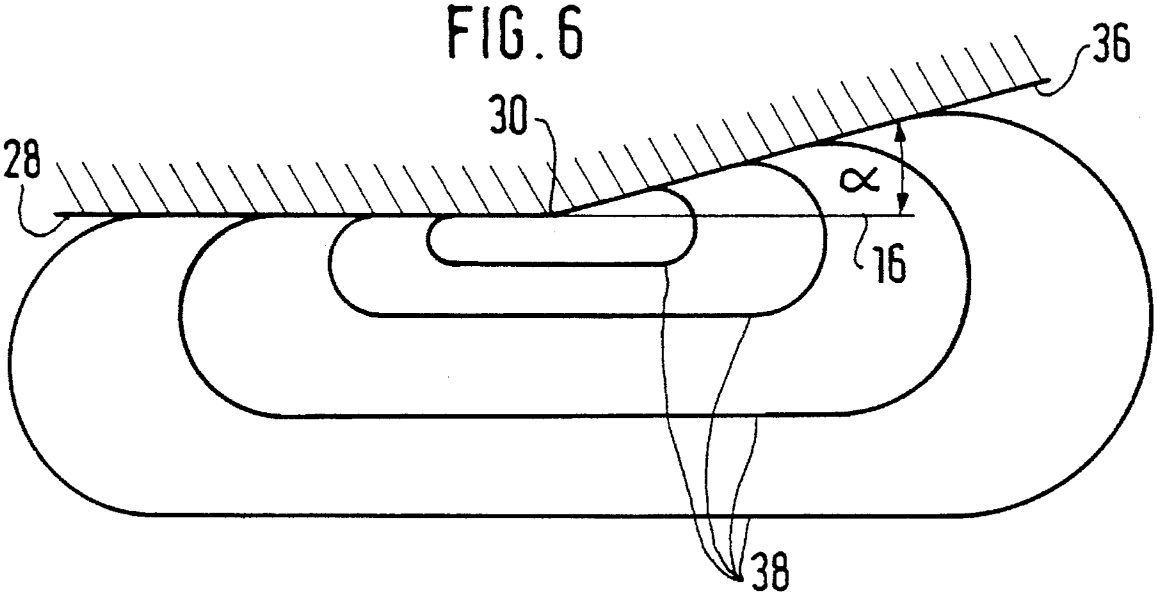
FIG. 6 is a view showing a light distribution produced by the headlight in accordance with the present invention.

Due to superimposition of all images of the light body 13 from the reflector 10, a light distribution shown in FIG. 6 is produced. It has the regulatorily prescribed light-dark limit 30 with the horizontal section 28 located on the opposite traffic side and the portion 36 which is located at the roadway side proper and are increasingly inclined relative to the roadway edge at an angle α. The light distribution is represented by several Isolux-lines 38 or in other words the lines with the same illumination intensity.

In accordance with a not shown variant of the headlight, the upper and lower reflector regions and 20 can be composed of several different sectors 19*a*, 19*b*, 20*a*, and 20*b* which contact one another in an axial plane and are continuous there at least in a first order or in other words merge into one another in a stepless manner.

It will be understood that each of the elements described above, or two or more together, may also find a useful application in other types of constructions differing from the types described above.

While the invention has been illustrated and described as embodied in a low beam headlight for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A low beam headlight for motor vehicles, comprising a reflector having an optical axis and a light outlet opening; a light body; a light disc covering said light outlet opening of said reflector, said reflector having an upper region and a lower region having reflection surfaces which have different shapes and at least partially form portions of at least approximately general paraboloid and which reflect images of said light body for forming a light distribution with a light-dark limit having a substantially horizontal portion and a portion which is inclined relative to said substantially horizontal portion at an angle α, said reflector being formed so that in sections through said reflector which are perpendicular to said optical axis, section curves are produced whose eccentricity is changeable over the course of the section curves so that an uppermost image of said light body which is reflected from a left part of said upper reflector region has an upper edge adjoining said horizontal portion of said light-dark limit, an uppermost image of said light body reflected from a right part of said upper reflector region as seen from a rear side of said reflector having an upper edge adjoining said inclined portion of said light-dark limit, an uppermost image of said light body which is reflected from a left part of said lower reflector region as seen from a rear side of said reflector has an upper edge which adjoins said inclined portion of said light-dark limit, an uppermost image of said light body reflected from a right part of said lower reflector region as seen from a rear side of said reflector has an upper edge adjoining said horizontal portion of said light-dark limit.

2. A low beam headlight as defined in claim 1, wherein said parts of at least one of said upper and lower reflector regions are continuously connected with one another at least in a first order.

3. A low beam headlight as defined in claim 1, wherein said parts of both said upper and lower reflector regions are continuously connected with one another at least in a first order.

4. A low beam headlight as defined in claim 1, wherein at least one of said upper and lower reflector regions as a whole has said reflection surface in form of a general paraboloid.

5. A low beam headlight as defined in claim 1, wherein both said upper and lower reflector regions as a whole have said reflection surface in form of a general paraboloid.

6. A low beam headlight for motor vehicles, comprising a reflector having an optical axis and a light outlet opening; a light body; a light disc covering said light outlet opening of said reflector, said reflector having an upper region and a lower region having reflection surfaces which have different shapes and at least partially form portions of at least approximately general paraboloid and which reflect images of said light body for forming a light distribution with a light-dark limit having a substantially horizontal portion and a portion which is inclined relative to said substantially horizontal portion at an angle α, said reflector being formed so that in sections through said reflector which are perpendicular to said optical axis, section curves are produced whose eccentricity is changeable over their course so that an uppermost image of said light body which is reflected from said upper reflector region has an upper edge adjoining said horizontal portion of said light-dark limit and an uppermost image of said light body which is reflected from said lower reflector region has an upper edge which adjoins said inclined portion of said light-dark limit, said upper and lower regions of said reflector contacting one another in a contact plane, said eccentricity of said section curves increasing from zero in said contact plane to a maximal value in an axial plane extending perpendicular to said contact plane, said contact plane being an axial plane which is inclined relative to a horizontal plane at half of the angle α of said inclined portion of said light-dark limit and in a same direction as said inclined portion.

7. A low beam headlight as defined in claim 6, wherein said upper reflector region and said lower reflector region have the section curves which are located in said contact plane and are identical, said section curves having a focal point located substantially in a center of said light body.

8. A low beam headlight as defined in claim 7, wherein said reflector has a reflector apex, said light body having an end region facing said reflector apex and an end region facing away from said reflector apex, said section curves including a section curve of said upper reflector region located in a perpendicular axial plane and having a focal point which is arranged substantially in said end region of said light body facing said reflector apex, and also a section curve of said lower reflector region located in said perpendicular axial plane and having a focal point arranged substantially in said end region of said light body facing away of said reflector apex.

9. A low beam headlight for motor vehicles, comprising a reflector having an optical axis and a light outlet opening; a light body; a light disc covering said light outlet opening of said reflector, said reflector having an upper region and a lower region having reflection surfaces which have different shapes and at least partially form portions of at least approximately general paraboloid and which reflect images of said light body for forming a light distribution with a light-dark limit having a substantially horizontal portion and a portion which is inclined relative to said substantially horizontal portion at an angle α, said reflector being formed so that in sections through said reflector which are perpendicular to said optical axis, section curves are produced whose eccentricity is changeable over their course so that an uppermost image of said light body which is reflected from said upper reflector region has an upper edge adjoining said horizontal portion of said light-dark limit and an uppermost image of said light body which is reflected from said lower reflector region has an upper edge which adjoins said inclined portion of said light-dark limit, said reflection surface of at least one of said upper and lower reflector regions being defined by the following equation in a Cartesian coordinate system having an x-axis, y-axis and z-axis:

$$\frac{x^2}{a^2}+\frac{y^2}{b^2}-1=0$$

wherein $a^2=4\cdot f_x\cdot z$ $$\text{and } b^2=4\cdot z\cdot\left[f_x+(f_y-f_x)\cdot\left(c\cdot\left|\frac{y}{4\cdot f_y\cdot z}\right|+(1-c)\cdot\left(\frac{y}{4\cdot f_y\cdot z}\right)^2\right)\right]$$

wherein

- the z-axis is the optical axis;
- the x-axis lies in the contact plane 17;
- the y-axis is perpendicular both to the x-axis and to the z-axis;
- x, y, x are the coordinates of a reflector point;
- $f_x$, $f_y$ are the focal lengths of the cutting curves located in the contact plane 17 and in the perpendicular axial plane 22 correspondingly; is a coefficient of adjusting an upper illumination edge to the required light-dark limit.

* * * * *